Patented Apr. 25, 1939

2,155,757

UNITED STATES PATENT OFFICE 2,155,757

EMULSIFIERS AND PROCESS OF PRODUCING THE SAME

Charles Graenacher, Basel, and Richard Sallmann, Arlesheim, Switzerland, assignors to the firm Society of Chemical Industry in Basle, Basel, Switzerland No Drawing. Application May 1, 1937, Serial No. 140,275. In Switzerland May 12, 1936

16 Claims. (Cl. 252—1)

This invention relates to the production of emulsifiers and is based on the observation that hydrophobe lipophil products can be emulsified with great advantage in water with the aid of mixtures of fatty acids of high molecular weight and such a cyclo-aliphatic base (preferably in approximately molecular proportions) which contains not more than one hydrogen atom at the nitrogen atom. Such mixtures contain or consist of salts of the fatty acids with the organic amines. These salts are more or less profoundly dissociated in water and pass into a gel condition with unexpected emulsifying effect and protective colloid effect. Thus the new mixtures are useful as very valuable emulsifiers.

Another object of the invention is the production of emulsions by adding the emulsifier as such or in the form of its constituents to the hydrophobe lipophil body and then mixing the mixture with water whilst stirring. Such mixtures of the hydrophobe lipophil product and the new emulsifier, the production of which is also an object of the present invention, are durable without limit and may easily be emulsified with water so that they have a high degree of practical importance. Alternatively, the emulsifier may be mixed with a little water and then added whilst stirring to the body to be emulsified. This latter method of operation is also an object of the present invention.

Fatty acids of high molecular weight are as follows: Acids of 9 to 20 carbon atoms with straight or branched chains, for instance lauric acid, coconut fatty acids, palmitic acid, stearic acid, hardened train oil acids; also unsaturated acids, for instance oleic acid, ricinoleic acid, poppy seed oil acids, linoleic acid, train oil acids or the like; other higher fatty acids also come into question, for instance cyclo-aliphatic fatty acids, resin acids, naphthenic acids or the like. Among the cyclo-aliphatic bases useful for the invention one may name quite generally the hydrogenation products of mono- and dialkylanilines, for instance dimethylaniline, diethylaniline, monoethylaniline, dimethyl-para-toluidine, monomethyl-ortho-toluidine, mono-ethyl-ortho-toluidine.

As products which are readily emulsified by this invention may be named hydrocarbons of the aliphatic or aromatic series, in particular liquid hydrocarbons, for instance benzine, petroleum, vaseline, paraffin oil, benzene, solvent naphtha, tetrahydronaphthalene, decaline; chlorinated hydrocarbons, for instance tetrachlorethane, chlorobenzene, chloronaphthalenese such as α-chloronaphthalene; nitro-bodies, for instance nitrobenzene; amines insoluble in water, for instance dimethylaniline or diethyl-α-naphthylamine; glycerides of higher fatty acids, for instance animal or vegetable fats (cocoa-butter, tallow, olive oil); waxes, for instance spermaceti; alcohols of high molecular weight; for instance olein alcohol; fatty acids of high molecular weight, for instance oleic acid.

The following examples illustrate the invention, the parts being by weight:—

Example 1

127 parts of dimethylcyclohexylamine are mixed with 282 parts of oleic acid and the mixture is heated for ½ hour at 60–70° C. The emulsifier thus obtained is liquid at room temperature and dissolves very freely in mineral oils and fatty oils.

5–10 parts of this emulsifier are dissolved in 100 parts of mineral oil, for instance diesel oil, a clear solution being obtained.

By mixing the emulsifiable mineral oil thus obtained with 4–5 parts of water whilst stirring well there is produced a good concentrated emulsion which can be highly diluted and is stable.

Similar stable emulsions are obtained when instead of dimethylcyclohexylamine oleate the mono-methyl- or mono-ethyl- or diethylcyclohexylamine oleate is used.

Example 2

10 parts of the emulsifier described in Example 1 are stirred into 100 parts of cod liver oil, whereby a clear solution is obtained. By stirring water into this oil there is produced very easily a finely dispersed and stable oil emulsion.

Example 3

127 parts of dimethylcyclohexylamine are mixed with 278 parts of linoleic acid and the mixture is heated for some time at 60–70° C.

10 parts of the emulsifier thus obtained are dissolved in a mixture consisting of 50 parts of mineral oil and 50 parts of α-chloronaphthalene, whereby a clear oil is obtained. This emulsifiable oil may be converted into a finely dispersed very stable emulsion by mixing it with water and suitably diluting it; the emulsion is useful as an agent for combating pests.

Example 4

Into 100 parts of castor oil 5–10 parts of the emulsifier described in Example 3 are stirred. The clear oil may be converted into a highly disperse emulsion by stirring water into it; this emulsion is useful in textile industry. Olive oil, poppy seed oil or the like may be similarly emulsified.

*Example 5*

10 parts of the emulsifier described in Example 1 as made from oleic acid and diethylcyclohexylamine are dissolved in a mixture of 20 parts of mineral oil and 60 parts of neat's-foot oil. The clear oil may be converted into a stable emulsion by gradually stirring water into it.

*Example 6*

Into 100 parts of a molten mixture of 90 parts of paraffin wax and 10 parts of beeswax are stirred 10 parts of the emulsifier described in Example 1, whereupon the whole is diluted with a solution of Marseilles soap whilst stirring until the paraffin wax content is 20 per cent. There is thus obtained a concentrated very stable emulsion of paraffin wax which may be diluted as desired to form a valuable textile assistant.

*Example 7*

100 parts of derris root resin are dissolved while heating in 100 parts of solvent naphtha. The clear solution, filtered if necessary, is mixed with 20 parts of the emulsifier made as described in Example 1. The emulsifier dissolves with the formation of a clear oil. By stirring 1 part of this oil into 2 parts of an aqueous solution of ammonia of 1 per cent. strength there is produced a concentrated stable solution of the resin which may then be diluted as desired.

What we claim is:

1. Process for the manufacture of emulsifiers, consisting in mixing together a fatty acid containing 9 to 20 carbon atoms in a straight chain and a tertiary cyclo-aliphatic base selected from the group consisting of dimethyl-cyclo-hexylamine and diethyl-cyclo-hexylamine.

2. Process for the manufacture of emulsifiers, consisting in mixing together a fatty acid containing 9 to 20 carbon atoms in a straight chain and dimethylcyclohexylamine.

3. Process for the manufacture of emulsifiers, consisting in mixing together a fatty acid containing 9 to 20 carbon atoms in a straight chain and diethylcyclohexylamine.

4. Process for the manufacture of emulsifiers, consisting in mixing together oleic acid and dimethylcyclohexylamine.

5. Process for the manufacture of emulsifiers, consisting in mixing together oleic acid and diethylcyclohexylamine.

6. Process for the manufacture of emulsifiers, consisting in mixing together linoleic acid and dimethylcyclohexylamine.

7. An emulsifier consisting of a mixture of a fatty acid containing 9 to 20 carbon atoms in a straight chain and a tertiary cyclo-aliphatic base selected from the group consisting of dimethyl-cyclo-hexylamine and diethyl-cyclo-hexylamine.

8. An emulsifier consisting of a mixture of a fatty acid containing 9 to 20 carbon atoms in a straight chain and dimethylcyclohexylamine.

9. An emulsifier consisting of a mixture of a fatty acid containing 9 to 20 carbon atoms in a straight chain and diethylcyclohexylamine.

10. An emulsifier consisting of a mixture of oleic acid and dimethylcyclohexylamine.

11. An emulsifier consisting of a mixture of oleic acid and diethylcyclohexylamine.

12. An emulsifier consisting of a mixture of linoleic acid and dimethylcyclohexylamine.

13. Process for the manufacture of products which, when stirred with water, pass smoothly into a stable emulsion, consisting in mixing a hydrophobe lipophil product with a mixture of a fatty acid containing 9 to 20 carbon atoms in a straight chain and a tertiary cyclo-aliphatic base selected from the group consisting of dimethyl-cyclo-hexylamine and diethyl-cyclo-hexylamine.

14. Process for the manufacture of products which, when stirred with water, pass smoothly into a stable emulsion, consisting in mixing a hydrophobe lipophil product with a mixture of oleic acid and dimethylcyclohexylamine.

15. Process for the manufacture of aqueous emulsions of hydrophobe lipophil products, consisting in conducting the emulsification in presence of a mixture of a fatty acid containing 9 to 20 carbon atoms in a straight chain and a tertiary cyclo-aliphatic base selected from the group consisting of dimethyl-cyclo-hexylamine and diethyl-cyclo-hexylamine.

16. Process for the manufacture of aqueous emulsions of hydrophobe lipophil products, consisting in conducting the emulsification in presence of a mixture of oleic acid and dimethylcyclohexylamine.

CHARLES GRAENACHER.
RICHARD SALLMANN.